United States Patent [19]

Cunard

[11] Patent Number: 4,562,893
[45] Date of Patent: Jan. 7, 1986

[54] TOY VEHICLE

[75] Inventor: Joel C. Cunard, Bedford, Pa.

[73] Assignee: Hedstrom Corporation, Bedford, Pa.

[21] Appl. No.: 563,221

[22] Filed: Dec. 19, 1983

[51] Int. Cl.$^4$ .............................................. B62D 11/04
[52] U.S. Cl. .................................... 180/6.5; 446/460;
446/465; 180/22
[58] Field of Search .................. 180/6.5, 333, 22, 6.48,
180/20, 21, 24.07, 27.12, 209, 23; 446/433, 457,
462, 463, 465, 466, 469

[56] References Cited

U.S. PATENT DOCUMENTS

| | | | |
|---|---|---|---|
| 3,180,305 | 4/1965 | Gower-Rempel | 180/333 |
| 3,530,356 | 12/1967 | Aronson | 320/61 |
| 3,712,397 | 1/1973 | Smith, III et al. | 180/6.2 |
| 4,199,036 | 4/1980 | Wereb | 180/6.5 |
| 4,226,292 | 10/1980 | Monte et al. | 180/6.5 |
| 4,410,060 | 10/1983 | Cunard | 180/205 |

*Primary Examiner*—David M. Mitchell
*Assistant Examiner*—Eric Culbreth
*Attorney, Agent, or Firm*—Cesari and McKenna

[57] ABSTRACT

A child's battery-operated ride-on toy vehicle includes a frame having at least three equal diameter wheels rotatively mounted to the frame at opposite sides thereof. The wheels at the front and/or rear of the vehicle at opposite sides of the vehicle are driven by a pair of independently operated relatively small DC electric motors. The wheels at the middle of the vehicle are not driven, but idle. The vehicle includes an on-board battery which is connected to the motors by way of a joystick control so that the vehicle occupant, by manipulating the joystick, can apply a battery voltage of either polarity to the motors so that the vehicle moves forward or in reverse or revolves in either direction on the spot. Due to the presence of the idler wheels, the vehicle can maneuver on all types of surfaces including rugs and carpeting without slipping or stalling.

8 Claims, 4 Drawing Figures

TOY VEHICLE

This invention relates to a toy vehicle. It relates more particularly to a child's ride-on toy that is propelled by battery power.

BACKGROUND OF THE INVENTION

With the advent of longer-lived rechargeable batteries and small efficient DC electric motors, a number of toy vehicles have been designed which are able to support a small child and propel him along the floor or ground under battery power. Thus, available on the market today are small battery-powered bikes and trikes, as well as four-wheeled carts. Small motors drive the rear wheels of these toys usually in the forward direction, although some vehicles such as carts can be operated in reverse by reversing the polarity of the voltage applied to the driving motors. Invariably, battery-operated ride-on toys of this general type are steered by handlebars, steering wheels or the like linked to the front wheels of the vehicles. Accordingly, they have definite minimum turning radii making it difficult to maneuver the vehicles in cramped quarters.

Attempts have been made to design such ride-on toys which can be steered by selectively driving the wheels at opposite sides of the vehicle in the manner of an army tank. Thus, if both rear wheels are driven forwardly, the vehicle moves in the forward direction; if both are operated in reverse, the vehicle moves backwards and if the rear wheels at opposite sides of the vehicle are rotated in opposite directions, the vehicle turns to the left or to the right practically on the spot. However, such attempts to date have not resulted in superior products. In some cases, the electric drives at the opposite sides of the vehicle have not been strong enough to enable the vehicle, while supporting a child of normal weight, to travel along, and turn on, some surfaces on which the vehicle is normally used, e.g. carpets and rugs. That is, on some tufted and deep-pile carpeting, the vehicle stops or stalls when the child tries to turn the vehicle in one direction or the other. Such stalling can cause the drive motors to overheat and burn out.

This problem can be avoided by using large electric motors to propel the vehicle. However, such motors add considerably to the overall expense of the vehicle not only because of the expense of the motors themselves, but also because such motors have large current requirements necessitating the use of larger, heavier and more expensive onboard batteries to power the motors. Also, such motors draw down the batteries more quickly, thereby shortening the time during which the vehicle can be operated between battery recharge cycles and shortening the useful life of the batteries themselves.

Prior battery-operated ride-on toys of this general type have been disadvantaged also because some children have found it difficult to control the toy's movements easily and accurately. Still further, some conventional ride-on toy vehicles are not as stable and safe for the child as they could be.

SUMMARY OF THE INVENTION

Accordingly, it is an object of the present invention to provide an improved child's battery-operated, ride-on toy vehicle.

Another object of the invention is to provide a vehicle of this general type which is steered by electric motor-driven wheels at the opposite sides of the vehicle.

A further object of the invention is to provide such a battery-operated vehicle which can travel and maneuver on carpeting and other surfaces on which a child is likely to operate the vehicle.

Still another object of the invention is to provide a battery-operated ride-on toy the movements of which can be easily and accurately controlled by the child.

Another object of the invention is to provide a battery-operated, ride-on toy vehicle having an improved electric steering mechanism.

Yet another object of the invention is to provide such a ride-on vehicle which is quite stable and which even a small child can operate safely.

A further object is to provide a vehicle such as this whose drive motors cannot overheat.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

The present toy vehicle comprises a generally rectangular tubular undercarriage or frame. The frame is supported on the floor or ground by at least three pairs of wheels rotatively mounted to the frame. The wheels of each pair are located on opposite sides of the vehicle frame. The wheels at each side of the frame are spaced apart more or less uniformly between the front and rear ends of the frame and the wheels all have the same relatively large diameter.

A pair of drive units are mounted to opposite sides of the frame. Each drive unit includes a battery-operated DC electric motor and a speed reduction gear train whose input gear is driven by the motor and whose output gear rotates one wheel of the pair of wheels at the front or rear of the frame. Sprockets are mounted for rotation with the pair of wheels at the front of the frame and the pair of wheels at the rear of the frame and the two sprockets at each side of the frame are mechanically coupled by a chain loop. Resultantly, the forwardmost and rearmost wheels at each side of the frame are rotated in unison by the motor-driven drive unit at that side of the frame independently of the wheels at the opposite side of the frame. In other words, the wheels at the front and rear of the frame are driven wheels, with the wheels at each side of the frame being driven independently. However, the pair or pairs of wheels between the front and rear pairs of wheels, while having the same diameter as the driven wheels, are themselves not driven; they simply idle.

A seat-defining vehicle body is mounted on and secured to the frame so that the wheels project down from each side of the body. The body is formed with a compartment for containing one or more rechargeable batteries. The electric motors of the pair of drive units are connected to the battery by way of a steering control and a switch having an OFF position wherein it disconnects the drive unit motors from the batteries and at least one ON position wherein the switch establishes electrical connections between the motors and the battery through the steering control. Preferably also, the vehicle includes means for preventing overheating of the motors due to excessive loads on those motors in the form of a cut-out switch in the circuit between the motors and the battery which senses an unusually high current draw in the circuit indicative of a motor overload condition.

The steering control is preferably in the form of a joystick which can be manipulated to a FORWARD position in which it connects the drive units on both sides of the vehicle to a battery voltage of one polarity causing the vehicle to move forward. The control can also be moved to a REVERSE position in which it connects the motors to a battery voltage of the opposite polarity causing the motors to drive the vehicle in reverse. Movement of the joystick control to its LEFT or RIGHT position connects the motors at opposite sides of the vehicle to receive battery voltages of opposite polarities so that the driven wheels at opposite sides of the vehicle rotate in opposite directions causing the vehicle to turn left or right practically right on the spot. When the joystick control is released, it automatically returns to its OFF position so that both motors are deenergized, causing the vehicle to stop.

While the pairs of driven wheels alone suffice to move the vehicle in the forward and reverse directions, it has been found that the pair or pairs of idler wheels between the driven wheels play a crucial role in enabling the vehicle to maneuver and turn on surfaces such as rugs, carpeting and packed dirt, while supporting a normal child's weight of, say, 60 lbs. If those idler wheels are omitted or if they are appreciably smaller than the driven wheels, the vehicle is sometimes not able to maneuver satisfactorily on those terrains. Rather, when the child attempts to turn or steer the vehicle to the left or to the right of its present course, in some cases, the driven wheels at one or both sides of the vehicle, while rotating, lose their grips on the supporting surface and simply revolve without moving the vehicle. In other instances, the driven wheels at one or both sides of the vehicle retain their grip on the supporting surface but stop turning. This stops the associated drive motor and results in a greatly increased current flow through the motor causing the motor to overheat. That overheated condition shortens the useful life of the motors and, in some extreme cases, burns out and destroys the motors. While the motors can be protected against such overheating by suitable thermal cutouts or protectors, the vehicle does stall or stop and must remain stopped until the overheated condition is relieved. Obviously, this is annoying and frustrating to the child who wishes to drive the vehicle in a continuous, not an intermittent, fashion. Of course, larger motors could be used to drive the vehicle. However, as discussed above, that solution makes the cost of making and operating the toy excessively high and it increases the battery recharge frequency.

We have found that electric motors of minimum size and moderate current draw do suffice to power the vehicle and its occupant over most terrains, including rugs and carpeting, provided at least one pair of idler wheels of the same diameter as the driven wheels is located between the pairs of driven wheels. Apparently, these idler wheels provide some necessary support for the vehicle and its occupant when the driven wheels at opposite sides of the vehicle are rotated in opposite directions to turn the vehicle so that those driven wheels neither slip nor stop on the surface being traversed. They seem to function more or less as moving pivots which encourage the vehicle to revolve freely practically about a single point in a left or right turn situation. Without those wheels, the vehicle does tend to slide or stall in a turn.

Thus, the inclusion of idler wheel pairs between the driven pairs of wheels enables rider-operated toy vehicles of this type to be driven by electric motors of relatively small size and weight powered from a battery of moderate size and weight and have a long operating life between battery recharge cycles and still be able to maneuver and turn on the terrains normally traversed by toys of this type.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figure 1:
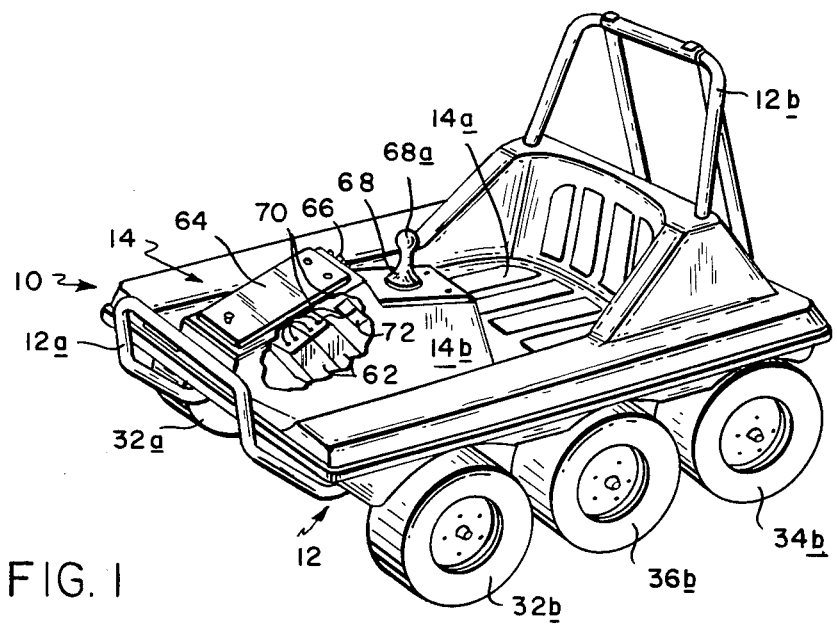
FIG. 1 is a perspective view with parts cut away showing a toy vehicle embodying the principles of this invention.
Figure 2:
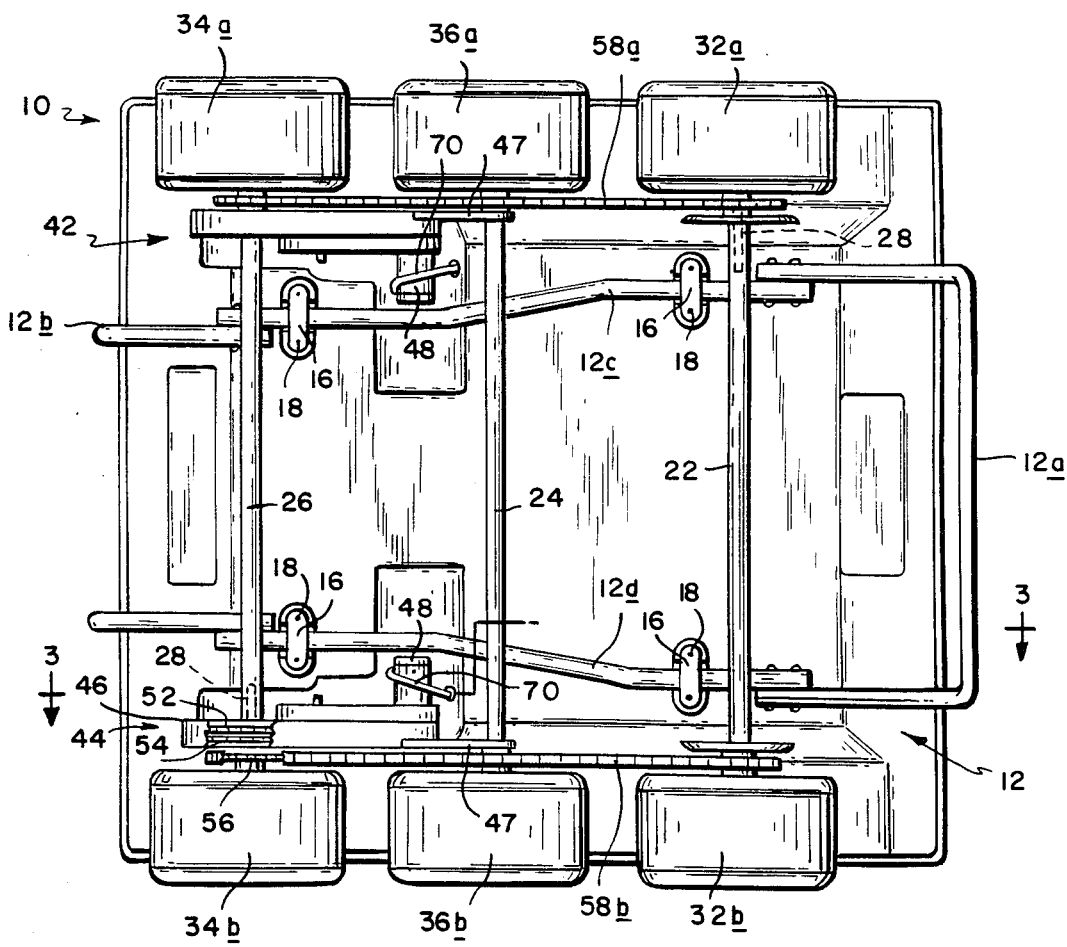
FIG. 2 is a bottom plan view on a larger scale of the FIG. 1 vehicle.

Referring to FIGS. 1 and 2 of the drawings, the subject toy vehicle indicated generally at 10 includes a generally rectangular tubular frame indicated generally at 12 which supports a unitary molded plastic vehicle body shown generally at 14. The body 14 defines a seat 14a and a raised battery compartment and control console 14b in front of the seat. Frame 12 includes frame members 12a and 12b which project up around the body at the front and rear of the vehicle respectively which function as bumpers, roll bars and lifting handles.

As best seen in FIG. 2, frame 12 also includes a pair of spaced-apart longitudinal or fore and aft-extending frame members 12c and 12d to which body 14 is connected by brackets 16 which engage under those frame members and are secured to the body by threaded fasteners 18. Frame 12 has, in addition, three spaced-apart lateral or side-to-side frame member 22, 24 and 26 secured to frame members 12c and 12d, as by welding, at spaced-apart locations along those latter two members. Frame member 22 is located under the front of body 14. Frame member 26 is located under the rear of the body and frame member 24 is more or less centered between members 22 and 26, all of the frame members combining to form a very rigid rectilinear vehicle undercarriage.

A pair of wheels is rotatively mounted to the opposite ends of each lateral frame member 22, 24 and 26 by axles 28 journaled in the ends of those frame members. Thus, a pair of wheels 32a and 32b are rotatively mounted in the opposite ends of member 22 at the front of the vehicle. A second pair of wheels 34a and 34b are rotatively mounted to the opposite ends of frame member 26 at the rear of the vehicle. Finally, a third pair of wheels 36a and 36b are rotatively mounted to the opposite ends of frame member 24 in the middle of the vehicle. As shown in FIG. 2, the wheels at each side of the vehicle are spaced apart uniformly and all of the wheels have essentially the same, relatively large (i.e., 8 inches) diameter so that, when the vehicle carrying a child rests on a surface such as a floor or rug, the weight is distributed so that all of the wheels engage that surface with more or less the same force.

Figure 3:
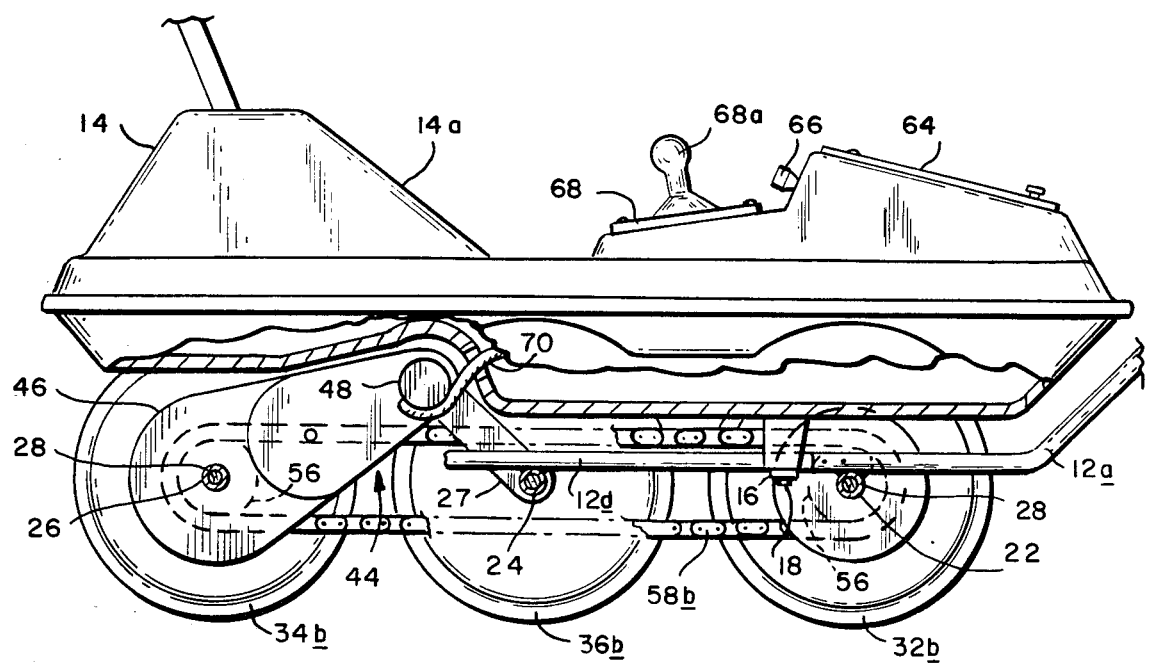
FIG. 3 is a sectional view along line 3—3 of FIG. 2.

Referring now to FIGS. 2 and 3, a pair of similar drive units indicated generally at 42 and 44 are mounted to opposite sides of frame 12 near the front of the vehicle directly under body 14. Each drive unit is quite similar to the one described in my U.S. Pat. No. 4,410,060; therefore, it need not be described in detail here. Suffice it to say that each drive unit includes a housing 46 engaged around frame member 22 at an end thereof, the opposite end of the housing being mounted by way of a bracket 47 to the end of frame member 24. Housing 46 contains a speed-reducing gear train. The first gear of the train is driven by a small DC electric motor 48 mounted to the drive unit housing 46. The last gear of the train, being shown at 52 in FIG. 2, interfits with a sprocket 54 as described in the aforesaid patent. That sprocket 54 rotates with the axle 28 supporting the wheel journaled in the end of frame member 22 adjacent the drive unit.

Thus, when the motor 48 of the drive unit 42 at the right side of the vehicle receives a voltage of one polarity, the associated wheel 34a is rotated in one direction, say the forward direction; when that motor receives a voltage of the opposite polarity, the wheel 34a is driven in reverse. Likewise, when the motor 48 of drive unit 44 at the left side of the vehicle receives a voltage of one or the other polarity, the associated wheel 34b is driven in the forward or reverse direction accordingly.

Identical sprockets 56 are mounted to rotate with the axles 28 projecting from the opposite ends of frame members 22 and 26 and which support the wheels at the four corners of the vehicle, namely wheels 32a, 32b, 34a and 34b. A chain loop 58a engages around the two sprockets 56 at the right side of the vehicle and a similar chain loop 58b engages around the two sprockets 56 at the left side of the vehicle, the two chains clearing the middle frame member 24 outboard of brackets 47. This enables the wheels 32a and 34a to be rotated in unison by drive unit 42 and wheels 32b and 34b to be rotated in unison by the second independent drive unit 44 so that the driven wheels at opposite sides of the vehicle can be operated independently of each other. The wheels 36a and 36b at the middle of the vehicle are not coupled to the chain drives and thus are free to rotate independently of the other wheels as well as independently of each other.

Referring now to FIGS. 1 and 3, the electric power for the drive units 42 and 44 is derived from one or more rechargeable batteries 62 supported inside the control console 14b of the vehicle body 14. A typical toy 10 has two batteries 62, each delivering 6 volts. Access to the batteries is had by lifting a small cover 64 in the front wall of console 14b. Mounted to a wall of the console are a speed control switch 66 and a steering control 68. The batteries, control switch, steering control and the drive motors 48 are all connected by wires 70 in an electrical circuit which enables the vehicle occupant to maneuver the vehicle over the floor or ground by properly operating the switch 66 and control 68.

The switch 66 is a three-position rocker switch. When the switch is in its middle position, there is no electrical connection made between batteries 62 and control 68. Therefore, drive motors 48 are not energized and the vehicle remains stationary. When switch 66 is rocked to one side, the voltage across one of the batteries 62 is applied by way of control 68 to both motors 48. Therefore, those motors are driven at a selected first speed and the vehicle is driven at a relatively slow speed in a direction depending upon the setting of control 68. When switch 66 is rocked to the other side, it applies the voltage across both batteries in series via the control 68 to the motors 48 so that the motors run faster and the vehicle moves at a selected higher rate of speed in the direction selected using control 68.

The control 68 is basically a five-position switching mechanism with the particular condition of the switch mechanism being selected by moving a joystick 68a. When the joystick is moved from its upright center position toward the front of the vehicle, the control applies the battery voltage selected by the speed control switch 66 to both motors 48 with a polarity such that both drive units 42 and 44 operate to rotate the driven wheels at both sides of the vehicle in the forward direction to propel the vehicle forwardly. When the joystick is pulled back from its upright position, the same voltage is applied to both drive units but with a polarity reversal so that the two drive units operate to rotate the driven wheels in the opposite direction so that the vehicle is moved in reverse. Movement of the joystick 68a to the left or to the right from its center position causes the control to apply a battery voltage of opposite polarity to the two drive units causing the vehicle to turn in one direction or the other. Thus, if the joystick is moved to the left, the wheels 32b and 34b at the left side of the vehicle are rotated in the reverse direction, while wheels 32a and 34a at the right side of the vehicle are rotated in the forward direction which wheel motions cause the vehicle to turn or revolve counterclockwise practically in place. Movement of the joystick 68a to the right reverses the opposite polarity voltages applied to the two drive units causing the vehicle to turn in the clockwise direction right on the spot. When the joystick 68a is released, it springs to its center position thereby interrupting all current flow to the drive motors 48 causing the vehicle to stop.

Preferably, a current responsive switch illustrated at 72 in FIG. 1 is connected in the circuit between batteries 62 and control 68 to protect the drive motors 48. If the driven wheels at one or both sides of the vehicle are prevented from turning for one reason or another, one or both drive motors 48 being inhibited, will draw excessive current causing switch 72 to open thereby interrupting current flow to the motors. Preferably, the switch is of a known type that will remain open for a definite time duration that will give the overheated motor or motors sufficient time to cool. The electrical connections between the batteries, switches, joystick control and drive motors to achieve the aforesaid results are quite conventional and need not be detailed here.

Figure 4:
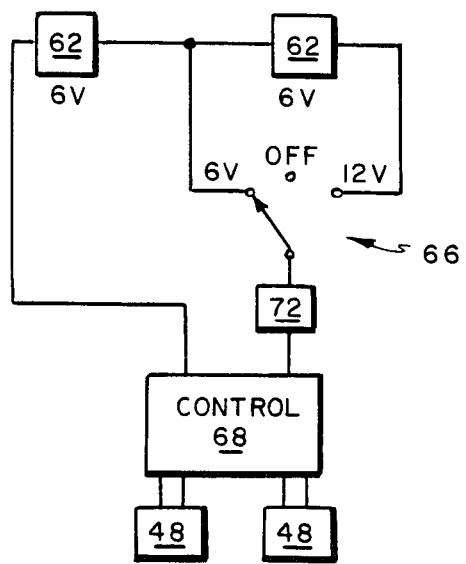
FIG. 4 is a partial schematic of the electrical circuitry for the vehicle in FIG. 1.

FIG. 4 illustrates the electrical connections between the batteries (62), the control switch 66, the control 68, cutout switch 72 and motors 48. As shown there, the batteries 62 are connected in series and switch 66 is a simple three-position switch which applies either six volts (one battery) or twelve volts (both batteris) via the cutout switch to control 68.

A toy vehicle constructed as above is able to support and transport a child of normal weight across carpeted floors, rugs, driveways and other surfaces on which toy venicles of this type are customarily used with only the relatively small inexpensive motors 48 providing the driving force. As noted above, these motors typically operate on either 6 or 12 volts depending upon the position of the speed control switch 66. During normal operation, at 6 volts, each motor draws about 2.7 amperes of current and its armature rotates at 11,300 rpm and develops a torque of about 0.8 oz. in. When driven by a 12 volt source, the motor draws about 3.6 amperes, its armature rotates at 23,000 rpm and develops an output torque of about 0.7 oz. in. Yet each motor is contained in a relatively small package which is only about 1½ inches in diameter and 2½ inches long. With such a motor and with tne gear train in each drive unit 42, 44 having a speed reduction of about 119:1, the toy vehicle is able to transport a child of normal weight, e.g. 60 lbs. at low and high speeds of about 3.25 miles per hour and 4.60 miles per hour, respectively, over a relatively flat paved surface.

Also, tne relatively small and inexpensive drive units 42 and 44 suffice to turn the vehicle and its occupant practically about the center point of the vehicle enabling the child occupant to maneuver the vehicle easily enough to follow an irregular path even in a highly congested area. The ability to do this stems from the inclusion in the vehicle of the two idler wheels 36a and 36b between the driven wheels. These wheels help support the weight of the vehicle and its occupant when the driven wheels at opposite sides of the vehicle are rotated in opposite directions to turn the toy. In such a turn, the nondriven wheels function as idlers. They may rotate at different speeds from the driven wheels and indeed one or both idlers may not rotate at all, but rather slip or skid on the supporting surface. Thus, in a turn, the idler wheel 36a or 36b on the outside of the turn usually rotates in tne forward direction at some indeterminate and varying speed. On the other hand, the idler wheel 36a or 36b on the inside of the turn rotates in the opposite direction from its outside counterpart at some different varying speed. The combination of the four driven wheels at the four corners of the vehicle and the nondriven wheels midway along the length of the vehicle enable the relatively small drive units 42 and 44 to turn the vehicle and its occupant even when the vehicle is traveling on surfaces such as carpets and rugs on which prior toys of this type have not performed particularly well.

With all these advantages, then, the present rideroperated toy vehicle should prove to be a very marketable product. Also, due to its low center of mass, i.e., about 16 inches, and wide wheel base, typically about 28 inches, the vehicle is quite stable so that there is little chance of its tipping over even when it is being turned at its maximum speed. Also, since the joystick control 68 returns automatically to its center position which stops the vehicle, there is little chance of a child being transported inadvertently to an unintended location.

It will thus be seen that the objects set forth above, among those made apparent from the preceding description, are efficiently attained. Also, certain changes may be made in the above description without departing from the scope of the invention. For example, in some applications, additional sprockets 56 may be mounted to the axles 28 supporting wheels 36a and 36b which are engaged by the chain loops 58a and 58b so that the intermediate wheels are also driven by drive units 42 and 44. In that event, however, the vehicle may not turn as well as when the wheels 36a and 36b are not driven. Therefore, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. A toy vehicle comprising
   A. a frame having a front, a rear and a pair of opposite sides;
   B. at least three substantially equal diameter wheels rotatively mounted to each side of the frame at locations distributed between the front and rear of the frame so that the bottoms of all of the wheels lie in substantially the same plane;
   C. first drive means mounted to the frame, said first drive means including
      (1) a relatively small DC electric motor;
      (2) a speed reduction unit having an input gear driven by the motor and an output gear rotatively coupled to a first wheel at the front or rear of the frame;
   D. second drive means mounted to the frame, said second drive means including
      (1) a second relatively small DC electric motor;
      (2) a second drive unit having an input gear driven by the second motor and an output gear rotatively coupled to a second wheel at the front or rear of the frame and being located on the opposite side of the frame from said first wheel;
   E. first means for rotatively coupling said first wheel and the wheel at the opposite end of the frame on the same side thereof;
   F. second means for rotatively coupling said second wheel and the wheel at the opposite end of the frame on the same side thereof; and
   G. wherein a wheel located between the coupled-together wheels on each side of the frame is an idler wheel;
   H. a vehicle body mounted on the frame;
   I. battery means supported by the frame;
   J. means for electrically connecting the battery means to the motors, said connecting means including hand-operated control means having a plurality of operative positions for applying battery means voltage of either polarity to each drive motor whereby an occupant of the vehicle can drive the vehicle forward or in reverse or cause it to revolve in either direction without the vehicle's slipping or stalling.

2. The toy vehicle defined in claim 1 wherein the connecting means also include a current responsive switch for disconnecting the battery means and the drive motors in response to an excessive current draw in the circuit between the battery means and drive motors indicative of an overheated motor.

3. The toy vehicle defined in claim 1 wherein
   A. the battery means comprise a plurality of separate batteries; and
   B. the connecting means include switch means in circuit between the batteries and the control means, said switch means having
      (1) a first operative position wherein the switch means apply the voltage across the plurality of batteries connected in series to said control means; and
      (2) a second operative position wherein the switch means apply the voltage across less than all of said plurality of batteries to the control means.

4. The toy vehicle defined in claim 1 each coupling means including
   A. sprockets mounted for rotation with the wheels at the front and rear of the frame; and B. a pair of chain loops connecting the sprockets at each side of the frame so that the front and rear wheels at each side of the frame rotate in unison.

5. The toy vehicle defined in claim 1 wherein
   A. the frame is generally rectangular and includes a pair of frame members at the front and rear of the frame which extend up around the frame body;
   B. the body is a generally rectangular molded plastic shell formed with a seat and a control console in front of the seat; and
   C. the battery and control means are mounted in said console.

6. A child's ride-on vehicle comprising
   A. a generally rectangular tubular frame including
      (1) a pair of laterally spaced, fore- and aft-extending members; and
      (2) a pair of lateral members connected to the fore and aft members at spaced-apart locations therealong;
   B. axles journaled at the opposite ends of the two lateral members;
   C. similar relatively large diameter drive wheels connected to the axles;
   D. sprockets mounted to rotate with said axles;
   E. a chain loop connecting the two sprockets at each side of the frame;
   F. first electromechanical drive means supported by the frame for rotating a first axle at one side of the frame;
   G. second electromechanical drive means supported by the frame for rotating a second axle at the other side of the frame independently of the first axle;
   H. a vehicle body mounted to said frame;
   I. battery means supported by the frame;
   J. means for electrically connecting the battery means to the motors, said connecting means including hand-operated control means having a plurality of operative positions for applying battery means voltage of either polarity to each drive motor; and
   K. an idler wheel rotatively mounted to the frame between the drive wheels at each side of the frame, said idler wheel having substantially the same diameter as the drive wheels whereby an occupant can drive the vehicle forward or in reverse or cause it to revolve in either direction without the vehicle's slipping or stalling.

7. A child's ride-on vehicle as defined in claim 6 wherein said drive means include
   A. an electric motor; and
   B. a speed-reducing gear train, the first gear of which is rotated by said motor and the last gear of which is rotatively coupled to said axle rotated by that drive means.

8. A child's ride-on vehicle as defined in claim 7 wherein
   A. the battery means comprise a plurality of separate batteries; and
   B. the connecting means include switch means in circuit between the batteries and the control means, said switch means having
      (1) a first operative position wherein the switch means apply the voltage across the plurality of batteries connected in series to said control means; and
      (2) a second operative position wherein the switch means apply the voltage across less than all of said plurality of batteries to the control means.

* * * * *